J. L. MILTON.
APPARATUS FOR GENERATING ALTERNATING CURRENTS.
APPLICATION FILED JAN. 30, 1909.

1,053,107.

Patented Feb. 11, 1913.
2 SHEETS—SHEET 1.

Witnesses
Geo. E. Higham.
Leonard W. Novander

Inventor
John L. Milton
By Brown Williams
Attorneys

J. L. MILTON.
APPARATUS FOR GENERATING ALTERNATING CURRENTS.
APPLICATION FILED JAN. 30, 1909.

1,053,107.

Patented Feb. 11, 1913.

2 SHEETS—SHEET 2.

Witnesses
George C. Higham
Leonard W. Novander

Inventor
John L. Milton
By Brown & Williams
Attorneys

UNITED STATES PATENT OFFICE.

JOHN LEWIS MILTON, OF CHICAGO, ILLINOIS.

APPARATUS FOR GENERATING ALTERNATING CURRENTS.

1,053,107. Specification of Letters Patent. Patented Feb. 11, 1913.

Application filed January 30, 1909. Serial No. 475,171.

*To all whom it may concern:*

Be it known that I, JOHN L. MILTON, a citizen of the United States, residing at Chicago, in the county of Cook and State of Illinois, have invented a certain new and useful Improvement in Apparatus for Generating Alternating Currents, of which the following is a full, clear, concise, and exact description, reference being had to the accompanying drawings, forming a part of this specification.

My invention relates to a method of generating alternating currents, and an apparatus adapted to carry my method into operation.

The particular object of my invention is to provide a method and means for producing alternating currents in connection with the operation of gas engines. That is to say, the alternating currents are used for sparking purposes to ignite the combustible mixtures.

In order to facilitate an understanding of my method of generating alternating currents, I shall first describe a form of apparatus which I have devised for carrying out the various steps involved in my new method,—the understanding being, of course, that the particular form of apparatus shown is for the sake of illustration upon the scope of my invention as embodied in my novel method of generating alternating currents.

Figure 1:
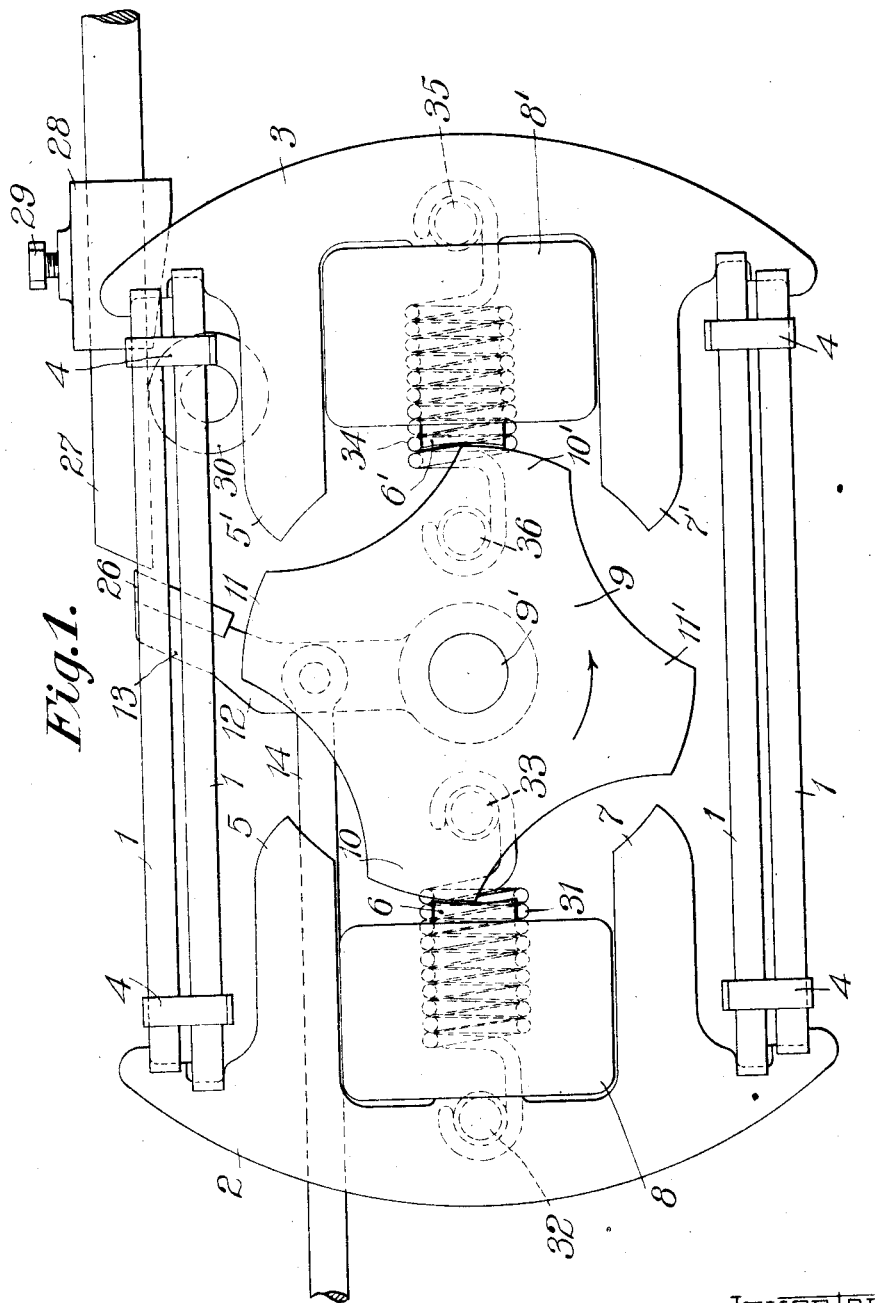
Figure 2:
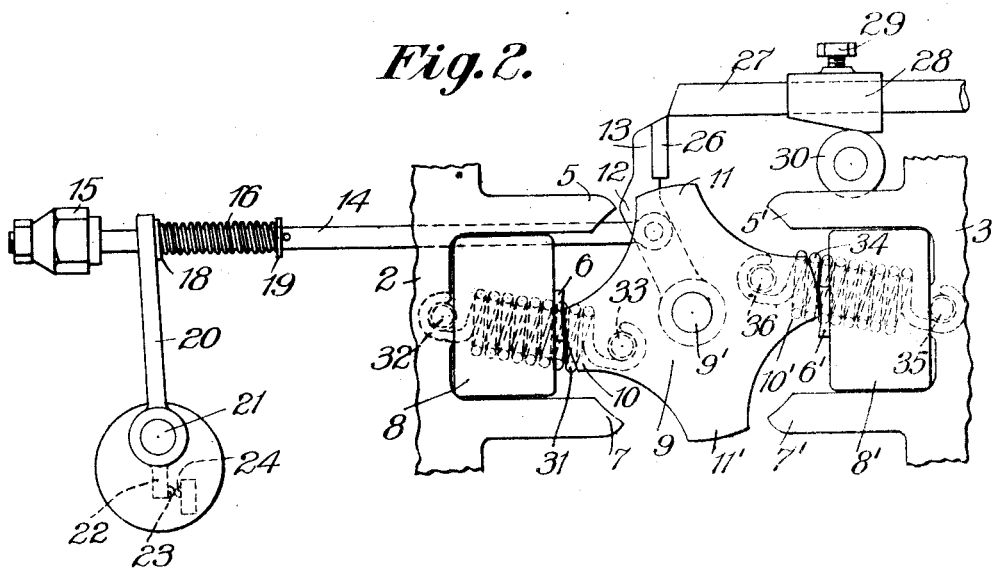
Figure 3:
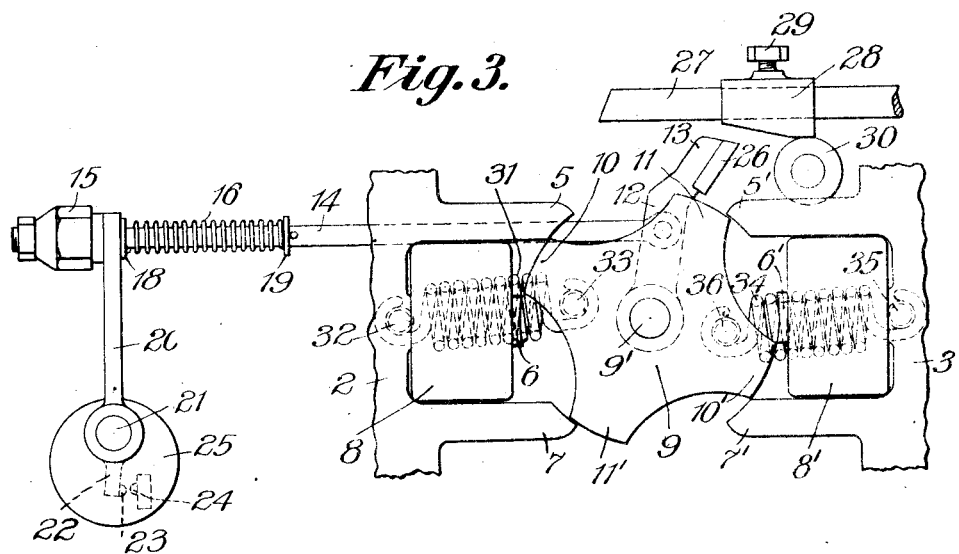

Referring to the drawings, Figure 1 is a front view of one form of inductor-alternator suitable for carrying out my method, the inductor being shown in its normal or initial position; Fig. 2 is a similar view of the same structure, the inductor being shown in the position in which it appears at the moment of release; Fig. 3 is a similar view of the same structure showing the position which the inductor assumes upon release under the influence of the springs.

The permanent magnets 1, shown in the drawings as straight-bar magnets, are at their ends secured to the ends of pole pieces 2 and 3. To facilitate connection between the magnets and the pole pieces, the ends of the magnets may be fork-shaped, so as to embrace snugly the end portions of the pole pieces, as indicated in Fig. 1. Bands 4 may be used for clamping the magnets together. It will be understood, of course, that the pole piece 2 connects poles of like polarity together,—say, for instance, the north poles of the magnets—while the pole piece 3 connects the other like poles together, as for instance, the south poles.

The pole piece 2 is provided with three polar projections 5, 6 and 7, while the pole piece 3 is provided with corresponding polar projections 5′, 6′ and 7′. The polar projections 6 and 6′ carry windings 8 and 8′, respectively, while the other four polar projections are unwound. Mounted to move in proximity to the polar projections is the inductor 9 secured to a suitable supporting shaft 9′. In the instance illustrated, the shape of the inductor is that of a Maltese cross, having diametrically opposite arms 10, 10′ and 11, 11′. Firmly seated on the shaft 9′ is the arm 12, provided with a projection 13. Pivoted to this arm is a rod 14, which, as shown in Figs. 2 and 3, carries at its outer end a head 15. A compression spring 16 is situated between the collars 18 and 19 on the rod 14. The collar 19 is fixed on the rod, while the collar 18 is slidable thereon. The rod 14 works through an aperture in the contact arm 20, which is pivotally mounted on a shaft or stud 21. The arm 20 has an extension 22, which carries the movable contact 23, the latter coöperating with the fixed contact 24 on the support 25. Removably secured to the projection 13 on the arm 12 is a piece of hard metal, such as steel, 26, which is adapted to be engaged by the end of the reciprocating rod 27. This rod is connected with the crank shaft of the engine in any suitable way, and is provided with a cam piece 28. By means of the set screw 29 the position of this cam piece on the rod 27 may be adjusted. A roller 30 is disposed in the path of the cam member 28, whereby the latter will ride over the surface of the roller in order to break connection at the proper moment between the arm 12 and the rod 27, as will be presently described. An expansion spring 31 is at one end secured to the pole piece 2 at 32 and at its other end secured to the inductor 9 at 33. Similarly, the expansion spring 34 is at one end secured to the pole piece 3 at 35 and at its other end secured to the inductor 9 at 36. The connections between the pole pieces and the inductor by means of the springs are such that the initial or normal position of the inductor will be that indicated in Fig. 1. That is to say, the arms 10 and 10′ are in proximity to the wound polar projections 6 and 6', respectively, but are out of alinement therewith, whereby a substantial short circuit of the magnetic flux through the windings is prevented. It will be observed that this direct connection of the springs to the polar pieces and the inductor is a very simple and effective one, and I consider it one of the novel features of the form of inductor-alternator herein shown.

From the above description of the device herein set forth, the various steps comprising my new method of generating high tension currents will now be readily understood, and I shall therefore proceed with an explanation of my method. As above stated, the rod 27 is suitably connected with the crank shaft of the engine so that during the operation of the engine the rod 27 will be moved to the left into contact with the engaging piece 26 on the arm 12. With the parts in their normal or initial position, as shown in Fig. 1, the reciprocating rod 27 will be moved to the left until after a certain interval it will be in the position shown in Fig. 2, from which it is seen that the cam member 28 has ridden over the roller 30 and raised the rod 27 until the forward end thereof is just about to break engagement with the contact piece 26 of the arm 12. Upon comparison of the position of the inductor as shown in Fig. 1 with its position as shown in Fig. 2, it will be seen that in being moved into what might be termed its operative position against the action of the springs 31 and 34, the inductor first caused a substantial magnetic short circuit through the windings 8 and 8' at the moment when the arms 10 and 10' were in alinement with the polar projections 6 and 6', respectively; then, the inductor being forced out of such alinement, partially interrupted such magnetic short circuit, thus decreasing the number of magnetic lines through the windings 8 and 8', until it finally reached the position shown in Fig. 2. Now when the inductor has reached this position, it is released by the breaking of engagement between the rod 27 and the arm 12, whereupon the springs 31 and 34 assert themselves and quickly move the inductor into the position in which it is shown in Fig. 3. Comparing the position of the inductor as shown in Fig. 2 with its final position as shown in Fig. 3, it will be noticed that during its travel under the action of the springs the inductor first caused a magnetic short circuit through the windings 8 and 8' at the moment when the arms 10 and 10' were in alinement with the polar projections 6 and 6', respectively; and then immediately the inductor assumed its final position as shown in Fig. 3, in which position, it will be seen, the magnetic short circuit through the windings is at the moment of interruption.

With regard to the action of the compression spring 16 on the rod 14 it will be observed that when the arm 12 is forced to the left from the position in which it is shown in Fig. 1 to that in which it is shown in Fig. 2, the spring 16 will be compressed, thus holding the arm 20 toward the left, whereby the contacts 23 and 24 will be firmly held together. However, when the engagement between the arm 12 and the rod 27 is broken, and the inductor moved into the position in which it is shown in Fig. 3, the head 15 on the rod 14 will come into violent contact with the upper end of the arm 20, forcing the latter quickly to the right, whereby the contacts 23 and 24 are separated, as shown in Fig. 3. This separation of the contacts, which causes an opening of the circuit in which the windings 8 and 8' are included, takes place substantially at the moment when the magnetic short circuit is broken; that is to say, when the inductor is in the position in which it is shown in Fig. 3. As is well understood, the breaking of the iron path for the flux when the inductor has reached the position in which it is shown in Fig. 3 generates a current of high electromotive force, which surging through the ignition circuit leaps across the sparking terminals to ignite the combustible mixtures in the cylinders of the gas engine. The inductor will, of course, not retain the position in which it is shown in Fig. 3 for the reason that that position is due to the moment of inertia of the inductor and the moving parts connected therewith, whereby the sudden action of the springs carries the inductor beyond its normal position. The extreme position of the inductor, as shown in Fig. 3, is more or less only momentary and it will immediately assume its normal position, as shown in Fig. 1, under the influence of the springs. I wish to call particular attention to the position of the inductor as it is shown in Fig. 2.

I discovered in experimenting with a machine constructed substantially as herein described that if the inductor be quickly carried, as is the case when it is operated by an engine at full speed from its initial position, as shown in Fig. 1, into a position in which the arms 10 and 10' are in alinement with the polar projections 6 and 6' and then released, the result was a very feeble spark. Upon investigation I found that by using a very strong pair of springs the spark would be increased, when the inductor was operated by the engine at full speed, and that by using a weaker pair of springs the spark would, under the same circumstances, not be perceptible. But if the inductor was slowly brought to the above-mentioned position in which the arms 10 and 10' are in alinement with polar projections 6 and 6', or if it was brought quickly into this position and then allowed to rest for a moment and then released, the return of the inductor under the influence of the springs would result in a very powerful spark. However, these conditions of operation do not obtain in the practical use of a gas engine, especially on automobiles where the speed of the engine varies between low speed and full speed, and where there would be no period of rest for the engine, such as is mentioned in the preceding sentence. However, even with the use of weak springs upon carrying the inductor beyond the position in which it causes a substantial magnetic short circuit into a position such as that shown in Fig. 2, where the short circuit is at least partially interrupted, and then releasing the inductor, the result was the production of a very powerful spark, at all speeds of operation of the engine. Now, as I comprehend it, the difference in the result obtained by operating the machine in the several ways as just described is due to the fact that in the first instance the electromotive force generated during the backward movement of the inductor had to spend itself largely in overcoming or neutralizing the high self-induced electromotive force which was set up when the inductor (operated by the engine at full speed) quickly caused a substantial magnetic short-circuit through the windings 8 and 8', so that the effective electromotive force was considerably small as compared with the generated electromotive force. However, by carrying the inductor beyond a position of alinement with the polar projections 6 and 6' into a position such as shown in Fig. 2, in which the magnetic short circuit has been partially and sufficiently interrupted, there is generated an electromotive force which opposes or cuts down the high self-induced electromotive force set up at the moment of the magnetic short circuit. The result of this cutting down or partial neutralization of that high self-induced electromotive force is that upon again establishing the magnetic circuit and immediately interrupting it, the electromotive force generated at the moment of interruption might be said to encounter a clear field,—that is to say, it does not have to weaken itself in opposing or killing off a high counter-electromotive force surging through the windings. As will be seen, this method of operation permits the use of very weak springs, which are highly desirable for mechanical reasons.

It will thus be seen upon an examination of the different positions in which the inductor is shown in Figs. 1, 2 and 3 during the operation of the device that the method which I have invented for generating high induction currents consists first in increasing the number of magnetic lines through the windings, as by causing a substantial magnetic short-circuit through the windings, then decreasing the number of magnetic lines through the windings in order to generate a self-induced electromotive force that will kill off the self-induced electromotive force which was set up by the current generated at the moment of the magnetic short-circuit, momentarily stopping the magnetic changes here before reversal, and then suddenly increasing and decreasing in quick succession the number of magnetic lines through the windings, the result of these various steps being the generation of a high tension current sufficient to produce sparks of considerable magnitude.

Of course it is understood, as I have already indicated, that the form of apparatus herein described is only illustrative of apparatus that may be employed to carry my method into operation, and that so far as the method is concerned other forms and modifications may be devised to carry my invention into effect.

As concerns the construction of the particular embodiment of inductor-alternator herein set forth, I do not wish to be confined to any of the details thereof any more than is described in the appended claims. It should be clear, for instance, that my novel arrangement of the springs and their connections with the moving and stationary parts of the inductor-alternator may be employed with various other forms of field structure and inductors, and still fall within the scope of my invention as defined in certain of the claims.

In my copending application, Serial No. 443,608, filed July 15, 1908, I claim matter which is disclosed but not claimed in this application, to wit, the generally circular contour of the field magnet structure with respect to the axis of the rotor.

Having thus described my invention, what I claim as new and desire to secure by Letters Patent of the United States is:

1. An inductor-alternator comprising, in combination, a magnetic field-frame provided with oppositely disposed pole-pieces, each of said pole-pieces having three polar projections, windings on the middle projections, an inductor mounted to move between said polar projections and provided with four radial arms to vary the magnetic flux through said windings, spring-means secured to said inductor and said field-frame for normally holding the inductor in a predetermined position relative to said polar projections, and means for periodically moving said inductor out of its normal position against the action of said spring-means, whereby said inductor will upon release move in the reverse direction under the action of said spring-means.

2. An inductor-alternator comprising, in combination, a magnetic field-frame provided with oppositely disposed pole-pieces, each of said pole-pieces having three polar projections, windings on the middle projections, an inductor mounted to move between said polar projections and provided with four radial arms to vary the magnetic flux through said windings, a pair of oppositely disposed springs secured each at one end to said inductor and at its other end to said field-frame for normally holding the inductor in a predetermined position relative to said polar projections, and means for periodically moving said inductor out of its normal position against the action of said springs, whereby said inductor will upon release move in the reverse direction under the action of said springs.

3. An inductor-alternator comprising, in combination, a magnetic field-frame provided with a pair of polar projections having windings thereon, a movable inductor having a pair of radial arms to co-act with said polar projections for varying the magnetic flux through said windings, spring-connections between said inductor and said field-frame for normally holding the inductor-arms in proximity to said polar projections but out of alinement therewith, and means for periodically moving said inductor-arms into alinement with said projections and beyond such position, whereby said inductor will upon release move in the reverse direction under the action of said spring-connection to generate a sparking-current.

4. An inductor-alternator comprising, in combination, a magnetic field-frame provided with a pair of diametrically opposite polar projections having windings thereon, a movable inductor having a pair of oppositely extending arms to coact with said polar projections for varying the magnetic flux through said windings, a pair of oppositely disposed spring-connections between said inductor and said field-frame for normally holding the inductor-arms in proximity to said polar projections but out of alinement therewith, and means for periodically moving said inductor-arms into alinement with said projections and beyond such position, whereby said inductor will upon release move in the reverse direction under the action of said spring-connections to generate a sparking-current.

5. An inductor-alternator comprising, in combination, a magnetic field-frame provided with oppositely disposed pole-pieces, each of said pole-pieces having three polar projections, windings on the middle projections, an inductor mounted to move between said polar projections and provided with four radial arms to vary the magnetic flux through said windings, spring-connections between said inductor and said field-frame for normally holding the inductor in a position such that a pair of diametrically opposite arms will be in proximity to said middle polar projections but out of alinement therewith, and means for periodically moving said inductor out of its normal position, so that said pair of arms will first come into alinement with said middle polar projections and then pass beyond such position, whereby said inductor will upon release move in a reverse direction and generate a sparking-current.

In witness whereof, I hereunto subscribe my name this 22nd day of January, A. D. 1909.

JOHN LEWIS MILTON.

Witnesses:
LEONARD W. NOVANDER,
A. A. THOMAS.